United States Patent [19]
Mito

[11] 3,858,228
[45] Dec. 31, 1974

[54] GYROSCOPIC HOLDER FOR CAMERA

[76] Inventor: Kunimasa Mito, 527 Minaminakamoru, Omiya-shi, Japan

[22] Filed: Oct. 4, 1973

[21] Appl. No.: 403,613

[52] U.S. Cl. .................................................. 354/293
[51] Int. Cl. .................................................. G03b 17/56
[58] Field of Search ................. 95/12.5, 31 EL, 86; 354/293

[56] References Cited
UNITED STATES PATENTS

| | | | |
|---|---|---|---|
| 1,586,070 | 5/1926 | Cooke | 95/12.5 |
| 1,863,573 | 6/1932 | Lutz | 95/12.5 |
| 1,880,960 | 10/1932 | Keale | 95/12.5 |
| 3,424,523 | 1/1969 | Branigan | 95/12.5 X |

Primary Examiner—John M. Horan

[57] ABSTRACT

A holder for a camera to ensure a photograph unaffected by undesirable movement of a hand-held camera comprises a casing accommodating therein one or more gyroscopes, means for detachable securing the camera to said casing, a pair of handles, and push button means associated with one of said handles for actuating the camera after a switch for operating the gyroscope or gyroscopes is closed, whereby the camera fixed to the holder is restrained from undesirable movement by operation of the gyroscope or gyroscopes during the exposure period.

6 Claims, 16 Drawing Figures

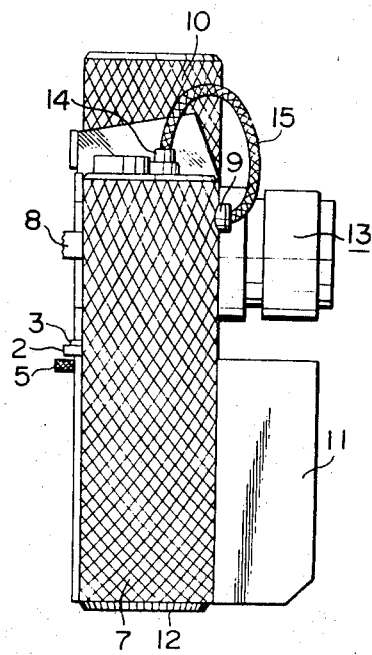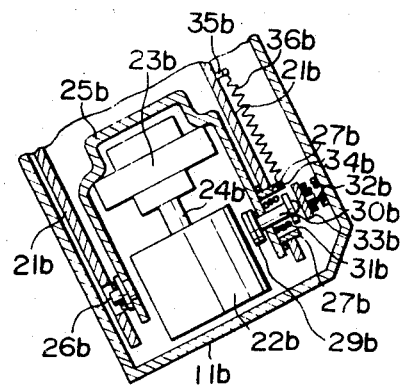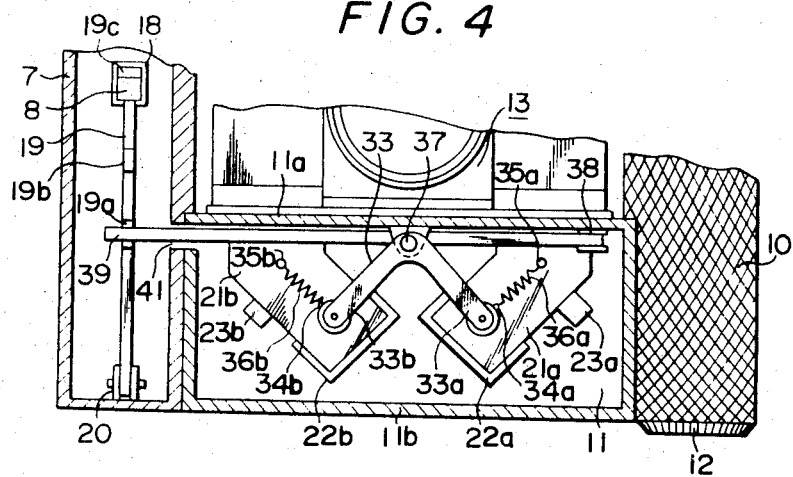

GYROSCOPIC HOLDER FOR CAMERA

BACKGROUND OF THE INVENTION

The present invention relates to a gyroscopic holder for a camera for preventing undesirable movement of a hand-held camera during the exposure period.

In general, using a photographic camera exposure is performed while the camera is held in the hand, and the same is true in the case of a small-sized motion picture camera. Therefore, such cameras are subject to undesirable movement cause by hand movements, and in the case of a still camera it is difficult to obtain a good picture when the shutter speed is slow, and in the case of a motion picture camera the photographed object appears unstable. For such reasons, a tripod or the like is used to hold the camera, but a tripod is somewhat cumbersome, resulting in a reduction of the advantage otherwise inuring to a small-sized photographic camera or a small-sized motion picture camera.

One object of the present invention is to provide a gyroscopic holder for a camera for preventing undesirable movement of a hand-held camera in photographing.

Another object of the present invention is to provide a gyroscopic holder for a camera including means for taking a picture while a gyroscope is in operation.

Further another object of the present invention is to provide a gyroscopic holder for a camera in which from the most effective position to stabilize the optical axis of a camera, a gyroscope whose axis moves angularly in the course of its operation is aided to return to said position by braking of the gyroscope simultaneously with the termination of the exposure period.

Still another object of the present invention is to provide a gyroscopic holder for a camera which stabilizes the optical axis of a camera in a certain direction by combining a plurality of gyroscopes so that the rotary axes thereof may be disposed at angles differing from one another as much as 90°.

Other objects of the present invention will be apparent from the detailed description of the several embodiments.

SUMMARY OF THE INVENTION

In order to attain the above-mentioned objects, the present invention relates to a gyroscopic holder for a camera, which comprises a casing accommodating therein one or more gyroscopes, means for operating the gyroscope or gyroscopes, means for detachably securing the camera to the holder, a pair of handles, and means associated with one of said handles to actuate the camera after the means for operating the gyroscope is actuated.

Said means for operating the gyroscope can be a power source and switch means for energizing a motor for driving the gyroscope. It is also possible to incorporate means to brake the gyroscope when said switch means is operated to de-energize the motor.

The means for actuating the camera can be a push button associated with one of the handles so as to facilitate actuation the camera while holding the gyroscopic holder. Said push button operates the switch means to energize the motor in a first step operation, and actuates the camera in a second step operation, and by releasing the push button a circuit for braking said motor is constituted. Accordingly, the gyroscope always is operated during the exposure period.

Associated with each said gyroscope there is provided a spring for biasing its rotary axis to a certain direction relative to the casing so as to direct the axis of the gyroscope to the most effective direction to prevent the optical axis of the camera from deflecting, and the axial direction of the gyroscope, if deviated from said direction due to operation of the gyroscope, can be restored when the gyroscope is braked to a stop.

BRIEF DESCRIPTION OF THE DRAWINGS

FIG. 3 is a side elevation of said embodiment.

FIG. 4 is a fragmentary front view of said embodiment, partly in vertical section.

FIG. 5 is a fragmentary side view of said gyroscope in vertical section.

FIG. 9 shows the relationship between axial directions in the case of two gyroscopes used, wherein

FIG. 10 and FIG. 11 show means for synchronizing the axial movement of two gyroscopes in the case where two gyroscopes are used, wherein FIG. 10 shows one example thereof and FIG. 11 shows another example thereof.

Figure 1:
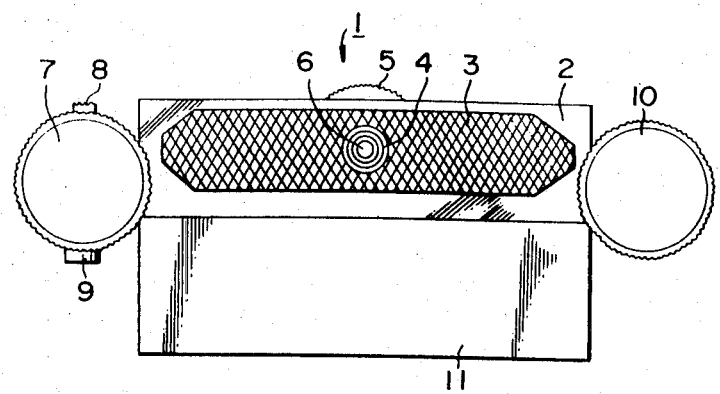
FIG. 1 is a top plan view of one embodiment in accordance with the present invention.

DETAILED DESCRIPTION OF THE INVENTION:

FIG. 1 to FIG. 6 show the first embodiment in accordance with the present invention, in which a gyroscope is braked mechanically to a stop.

Gyroscopic holder 1 comprises mounting base 2 for camera 13, handles 7 and 10 formed on the respective ends of mounting base 2, and casing 11 for the gyroscope beneath mounting base 2.

To mounting base 2 an elastic sheet 3 is adhered, on which the bottom of camera 13 rests and in the center of said base 2 there is provided a hole 4 through which a screw 6 passes, to be screwed into a threaded hole provided on the bottom of the camera Knob 5 for rotating said screw 6 has a portion projecting at the rear, on the under side of mounting base 2.

Figure 2:
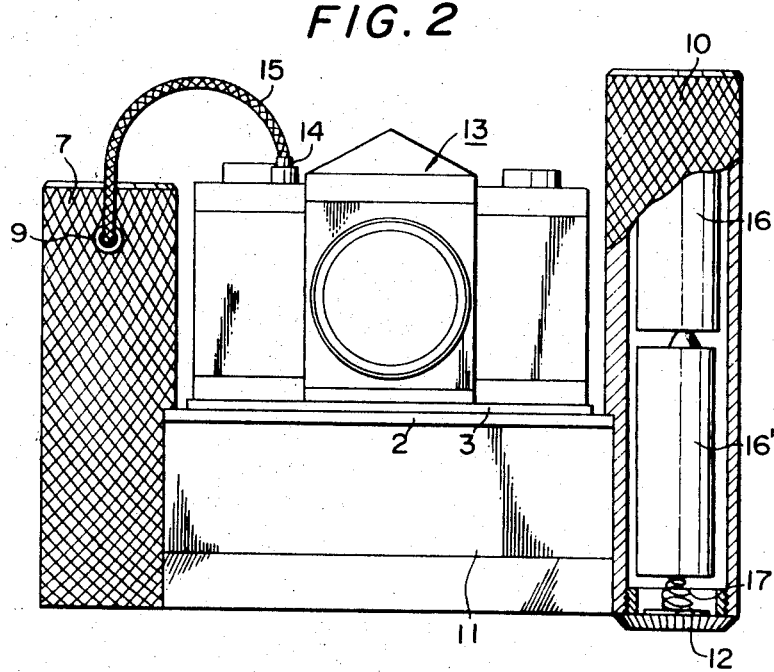
FIG. 2 is a front elevation, partly in vertical section, of said embodiment on the mounting base of which a camera is attached.
Figure 6:
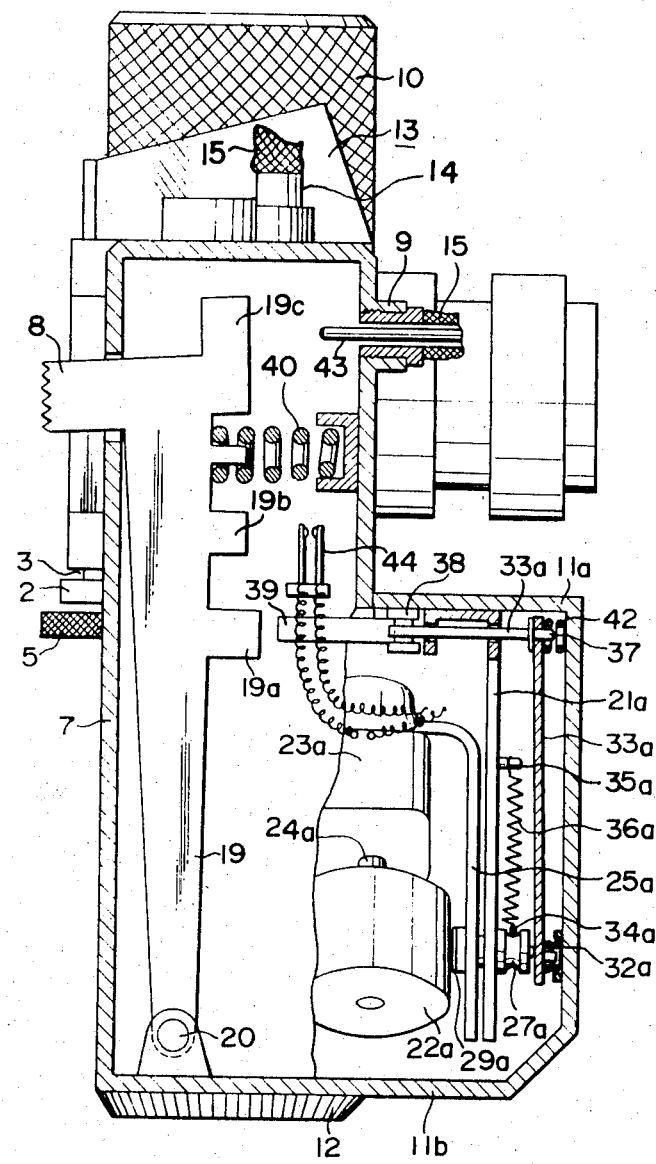
FIG. 6 is a side view in vertical section of said embodiment.

As shown in the front view of FIG. 2, at the front of left handle 7 there is provided fitting 9 for attaching flexible shaft 15, which is connectable to release button 14 for the camera 13. Inside of handle 7 an operation lever 19 (FIG. 6) is pivoted on shaft 20 and biased by spring 40 so that operation button 8 may project out of opening 18 of handle 7 provided in back of said fitting 9. As shown in FIG. 6, on the front edge of operation lever 19 there are provided third projection 19c for engaging with release wire 43 of flexible shaft 15, and first projection 19a and second 19b separately therefrom.

As shown in FIG. 2, the inside of right handle 10 is a hollow having a removable cover 12, and batteries 16 and 16' for driving the gyroscope an accommodated therein.

To top plate 11a of casing 11 (FIG. 4) on the lower side of mounting base 2, two support members 21a and 21b are fixed. Said fixed support member 21a and 21b are of the same pattern and only one of them, member 21b, will be described. As shown in FIG. 5, movable gimbals 25b pivoted on shafts 26b and 27b relative to said fixed member 21b has spring 36b, connected between spring hanger portion 34b formed on the external perimeter of shaft 27b and spring hanger portion 35b of fixed support member 21b and is biased in a certain direction relative to fixed member 21b.

A motor 23b is fixed to movable support 25b and a gyroscope 22b is fixed to its rotary shaft 24b.

In order that the rotary shafts of the two gyroscopes 22a and 22b may be at right angles to each other and that the plane formed by both rotary shafts may be at right angles to the optical axis of the camera attached to mounting base 2, the directions of the rotary shafts of both gyroscopes 22a and 22b are controlled by said springs 36a and 36b, respectively.

One end of transmission lever 39 passing through opening 41 communicating between casing 11 and handle 7 is pivoted on shaft 38 in casing 11, and the other end thereof is engageable with first projection 19a of said operation lever 19 in handle 7. Operating rod 37 engageable with transmission lever 39 is slidably supported parallel to upper wall 11a of the casing and is biased by spring 42 to engage transmission lever 39.

Operating member 33 (FIG. 4) having arms 33a and 33b at right angles to each other is fixed to operating shaft 37. Brake shaft 30b (FIG. 5) passing through shaft 27b of movable support 25b has on its internal end a brake shoe 29b slidably engageable with gyroscope 22b as shown in FIG. 5, and said brake shaft 30b is urged outwardly by spring 31b, in a direction to disengage brake shoe 29b from gyroscope 22b. The external end of said brake is in contact with one arm 33b of operating member 33, to press brake shaft 30b inwardly by means of spring 32b having a spring force stronger than that of said spring 31b, and brake shoe 29b is pressed onto gyroscope 22b against the force of spring 31b.

As shown in FIG. 6, facing second projection 19b of operation lever 19 there is provided normally open switch 44 between motors 23a and 23b and electric power sources 16 and 16'.

In the case of the embodiment as described above, photographing is performed in the following sequence: Onto mounting base 2 of holder 1 camera 13 is fixed by screw 6, and to release button 14 and fitting 9 both ends of flexible shaft 15 accommodating release wire 43 are screwed respectively. Holding handles 7 and 10, camera 13 is directed toward the object to be photographed and brought into focus. Then upon pushing operation button 8 against spring 40, first projection 19a engages with transmission lever 39 to turn it on shaft 38 as a center, and operating rod 37 engaging with transmission lever 39, slides to the right side in FIG. 6 against spring 42 and both operating members 33a and 33b are moved to the right against springs 32a and 32b, therefore, brake shafts 30a and 30b are moved outwardly in FIG. 5, respectively by springs 31a and 31b, to brake shoes 29a and 29b respectively from gyroscopes 22a and 22b and thus release them.

Then, in the second step second projection 19b of operation lever 19 closes switch 44 to drive motors 23a and 23b to rotate gyroscopes 22a and 22b, respectively, and stabilize the holder 1.

Further, in the third step third projection 19c presses release wire 43 to release the shutter of camera 13.

Therefore, when the film is exposed the optical axis of the camera on holder 1 is securely directed in the desired direction and there is no fear of spoiling the picture by reason of undesirable movements of the camera.

As operation button 8 is released, after switch 44 is opened the brake shoes 29a and 29b are brought into contact with gyroscopes 22a and 22b by means of springs 32a and 32b, respectively, to brake them to a stop.

Shafts 24a and 24b of said gyroscopes, if subjected to deviation in the course of their operation, are restored by springs 36a and 36b respectively to return to their original state.

Figure 7:
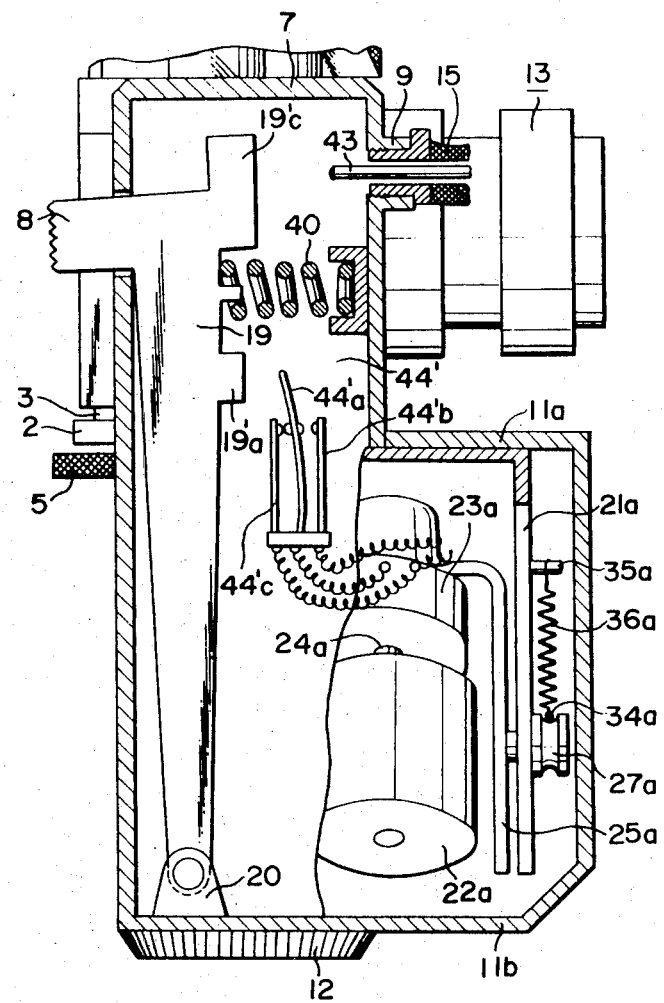
FIG. 7 is a side view in vertical section of another embodiment in accordance with the present invention.
Figure 8:
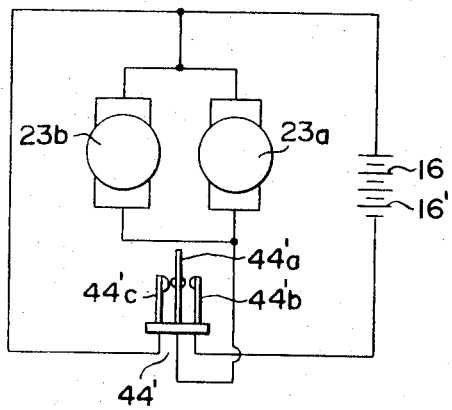
FIG. 8 is a circuit diagram of the means for driving and controlling the gyroscope of said embodiment.

In the second embodiment of the present invention shown various elements of FIG. 7 and FIG. 8, in the first embodiment are eliminated including first projection 19a of operation lever 19, transmission lever 39, rotary shaft 38, operating shaft 37, operating member 33, springs 32a and 32b, brake shafts 30a and 30b, springs 31a and 31b, and brake shoes 29a and 29b for braking gyroscopes 22a and 22b mechanically instead the braking of gyroscopes 22a and 22b is electrically effected. In said FIG. 7 and FIG. 8 the parts which are the same as those in the first embodiment are identified by the same reference characters as those in said first embodiment, and only the distinctions between said embodiments will be described in detail.

Operation lever 19 has operating projection 19'a and release projection 19'c, and switch 44' operated by operating projection 19'a is composed of movable contact piece 44'a engageable with operating projection 19'a, fixed contact piece 44'b from which said movable contact piece 44'a has a tendency to open, and fixed contact piece 44'c to which said movable contact piece 44'a has a tendency to close. Release projection 19'c and release wire 43 are so formed that after operating projection 19'a disengages movable contact piece 44'a from contact piece 44'c to and cause movable contact piece 44'a to engage contact piece 44'b, when operation button 8 is further pressed against spring 40 said release projection 19'a engages release wire 43 to release the shutter.

As shown in FIG. 8, movable contact piece 44'a and contact piece 44'a are connected in series to electric power sources 16 and 16' and motors 23a and 23b, and when contact piece 44'a comes into contact with contact piece 44'b the motor driving circuit is closed. And, movable contact piece 44'a and contact piece 44'c are connected in series to respective shunts of motors 23a and 23b, and when contact piece 44'a comes into contact with contact piece 44'a the braking circuits of both motors 23a and 23b are closed.

That is to say, when operation button 8 is not pushed the motor braking circuit is closed by spring 40, and gyroscopes 22a and 22b are braked. In the first step in which operation button 8 is pressed against spring 40, first of all the braking circuit is opened and in the second step in which operation button 8 is further pressed, the motor driving circuit is closed and gyroscopes 22a and 22b are caused to rotate. In the third step in which operation button 8 is pressed further release projection 19'c comes into contact with release wire 43 to release the shutter.

As operation button 8 is released, the motor driving circuit is first opened and then the motor braking circuit is closed, accordingly, the rotations of gyroscopes 22a and 22b are braked and shafts 24a and 24b of said gyroscopes if they have deviated in the course of their operation, are restored by springs 36a and 36b.

Figure 9A:
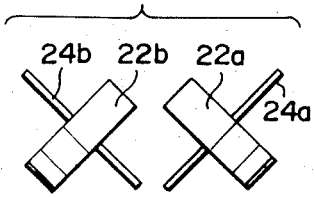
FIG. 9(A), FIG. 9(B) and FIG. 9(C) show respective modes diagrammatically.
Figure 9B:
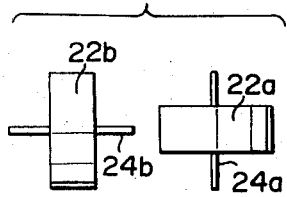
Figure 9C:
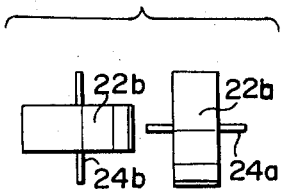

As regards the stability of holder 1 effected by a gyroscope it is preferable to use two or more gyroscopes with their axes at right angles to each other, however, for this purpose it is not always required to construct the device as shown by the first and second embodiments in FIG. 9 (A) but it is also possible to arrange the gyroscopes as shown in FIGS. 9 (B) and 9 (C).

In these cases, both gyroscopes are operated and even though the direction of their axes changes during operation, it is preferable that the rotary shafts of both gyroscopes are always at right angles to each other.

Figure 10:
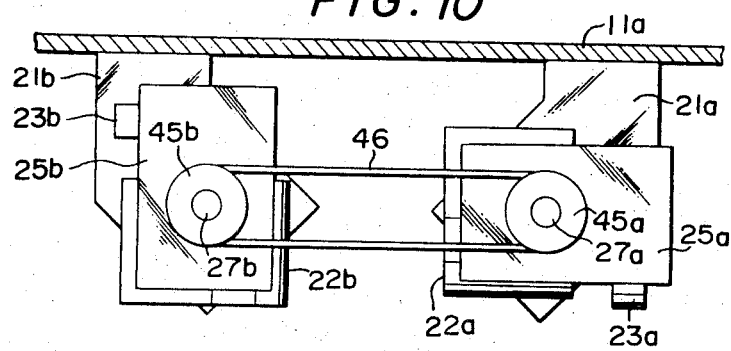
Figure 11:
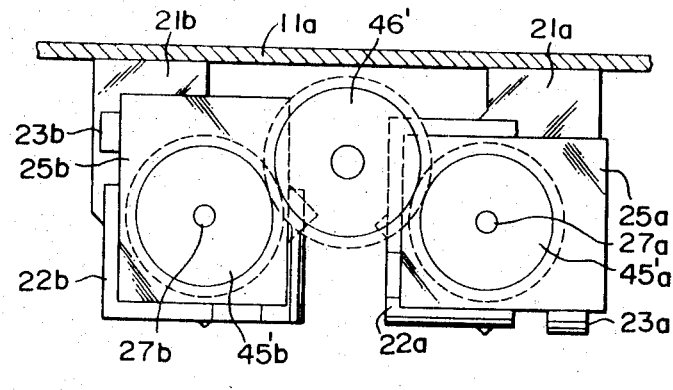

Embodiments employing this arrangement are shown in FIG. 10 and FIG. 11. In the embodiment shown in FIG. 10, rotary shafts 27a and 27b journaled in fixed support members 21a and 21b and carrying movable supports 25a and 25b, are provided with pullies 45a and 45b respectively connected by belt 46. In the embodiment shown in FIG. 11, rotary shafts 27a, and 27b for movable support 25a and 25b carry gears 45'b and 45'b of the same pattern, connected by intermediate gear 46'.

Figure 12:
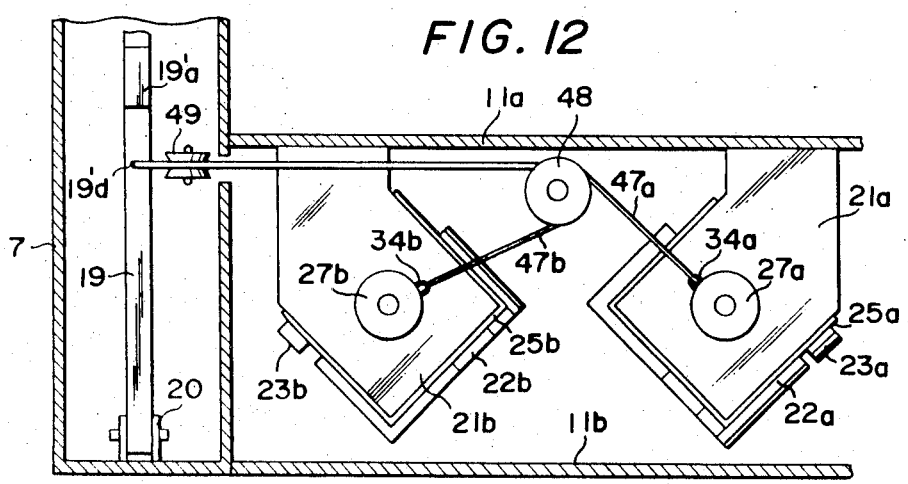
FIG. 12 shows an embodiment of the directional control for gyroscope supports making use of wires.
Figure 13:
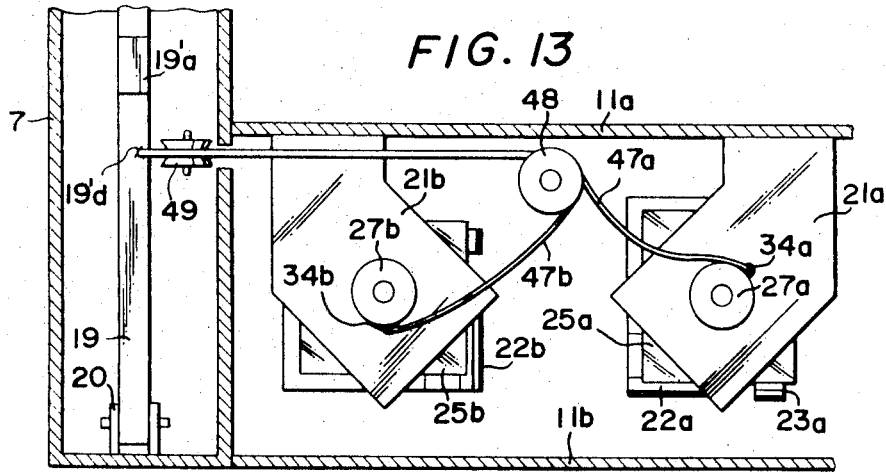
FIG. 13 shows said embodiment when said control is released.

In the above-mentioned first and second embodiments, when gyroscopes 22a and 22b are stopped the deviation brought about in the course of their operation is restored by springs 36a and 36b; however, it can similarly be restored by wires connected to operation lever 19. Such arrangements are shown in FIG. 12 and FIG. 13, wherein, to hanger portions 34a and 34b of rotary shafts 27a and 27b, one end of each of wires 47a and 47b, respectively, is fastened respectively and the other ends of said wires 47a and 47b being fastened to hanger portion 19'd of operation lever 19 through swivel pullies 48 and 49 respectively. When operation lever 19 is released wires 47a and 47b are tensioned by spring 40 to regulate the directions of rotary shafts 27a and 27b, and when operation button 8 is pushed wires 47a and 47b are slackened to permit the movement of rotary shafts 27a and 27b effected by their operation.

Further, when said wires 47a and 47b are tensioned and the rotary shafts of movable supports 25a and 25b take a certain direction relative to fixed support members 21a and 21b, there is provided a means for locking the shafts 26a and 27a and 26b and 27b. Said locking is designed to be released after operation lever 19 is operated to actuate gyroscopes 22a and 22b, and just before the shutter is released. Gyroscopes 22a and 22b can thus be prevented from changing position until the shutter is released.

Figure 14:
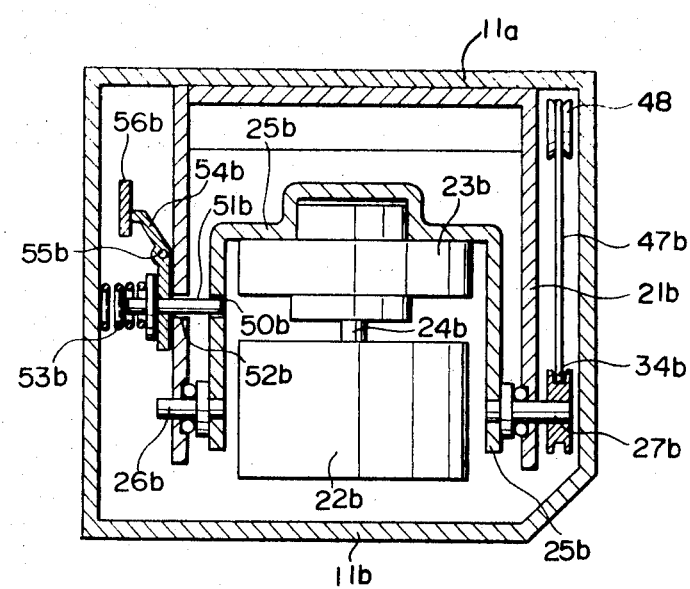
FIG. 14 is a partial side view in vertical section a further embodiment.

This embodiment is shown in FIG. 14, wherein there is arranged retaining pin 51b which is slidably fitted in shaft hole 52b of fixed support member 21b and which is also biased by spring 53b so as to loosely fit in interlocking hole 50b of movable support 25b release lever 54b interlocking with said retaining pin 51b is supported by shaft 55b so as to be in contact with fixed support member 21b and is provided with actuation piece 56b to interlock therewith.

Actuation piece 56b is interlocked with operation lever 19 and, by means of release lever 54b, retracts retaining pin 51b from movable support 25b, against spring 53b, immediately before the shutter is released by operation lever 19, and thereby locking is released.

Although the invention has been described in its preferred form with a certain degree of particularity, it is understood that the present disclosure of the preferred form can be changed in the details of construction and that variations in the arrangement of parts may be resorted to without departing from the spirit and the scope of the invention as hereinafter claimed.

What is claimed is:

1. A gyroscope holder for a camera comprising:
a mounting base for a camera and means for detachably fixing a camera thereon;
a casing containing a gyroscope mounted on pivots around which its rotary shaft can move angularly;
means for operating said gyroscope;
handles provided on both sides of said mounting base; and
means associated with one of said handles for first activating said means for operating said gyroscope and then releasing the shutter of a camera fixed to said mounting base, wherein said means for releasing the shutter of the camera fixed to the mounting base is an operation member biased to a rest position by spring means, provided with an operation button, and movable to a position in which the shutter is released after said means for operating the gyroscope is activated,
and further comprising means for braking the rotation of the gyroscope when said operation member is situated in the rest position.

2. A gyroscopic holder for a camera as claimed in claim 1, wherein said casing is provided with a plurality of gyroscopes therein, said braking means serving to brake all gyroscopes at the same time when said operation member is situated in the rest position.

3. A gyroscopic holder for a camera as claimed in claim 2, further comprising:
means for biasing the axial direction of said gyroscopes so that their respective axes are at right angles to one another when said gyroscopes are braked to a stop.

4. A gyroscopic holder for a camera as claimed in claim 3, further comprising:
means for holding the respective axes of said gyroscopes at angles of 90° to each other during angular movements of the respective axes of said gyroscopes, when a plurality of gyroscopes are operated.

5. A gyroscopic holder for a camera as claimed in claim 1, further comprising:
a motor for driving said gyroscope;
an electric power source for energizing said motor;
first switching means connected in series to said electric power source and motor;
a motor braking circuit for short-circuiting across both terminals of said motors; and
second switching means connected in series to said motor braking circuit.

6. A gyroscopic holder for a camera as claimed in claim 5, wherein movement of said operating member to the first rest position closes said second switching means, movement of said member to a second position opens said second switching means, movement of said member to a third position holds said second switching means open and closes the first switching means, and movement of said member to a fourth operating position holds said second switching means open and the first switching means closed while releasing the camera shutter.

* * * * *